(12) United States Patent
Inbe et al.

(10) Patent No.: US 11,041,079 B2
(45) Date of Patent: Jun. 22, 2021

(54) ELECTRODEPOSITION COATING COMPOSITION AND ELECTRODEPOSITION COATING METHOD

(71) Applicant: NIPPON PAINT AUTOMOTIVE COATINGS CO., LTD., Osaka (JP)

(72) Inventors: Toshio Inbe, Neyagawa (JP); Yohei Tago, Neyagawa (JP); Nobuhiro Miyamae, Neyagawa (JP)

(73) Assignee: NIPPON PAINT AUTOMOTIVE COATINGS CO., LTD., Osaka (JP)

( * ) Notice: Subject to any disclaimer, the term of this patent is extended or adjusted under 35 U.S.C. 154(b) by 165 days.

(21) Appl. No.: 15/128,155

(22) PCT Filed: Feb. 27, 2015

(86) PCT No.: PCT/JP2015/055804
§ 371 (c)(1),
(2) Date: Sep. 22, 2016

(87) PCT Pub. No.: WO2015/146480
PCT Pub. Date: Oct. 1, 2015

(65) Prior Publication Data
US 2017/0158882 A1   Jun. 8, 2017

(30) Foreign Application Priority Data
Mar. 25, 2014 (JP) .............................. JP2014-061243

(51) Int. Cl.
*C09D 5/44* (2006.01)
*C09D 163/00* (2006.01)
(Continued)

(52) U.S. Cl.
CPC ............. *C09D 5/44* (2013.01); *C08G 18/584* (2013.01); *C08G 18/8074* (2013.01);
(Continued)

(58) Field of Classification Search
CPC . C09D 5/44; C09D 5/08; C09D 5/443; C09D 5/4457; C09D 163/00;
(Continued)

(56) References Cited

U.S. PATENT DOCUMENTS

| 5,936,013 A | 8/1999 | Feola et al. |
| 6,334,940 B1 * | 1/2002 | Muramoto ............... B05D 1/34 |
| | | 204/486 |

(Continued)

FOREIGN PATENT DOCUMENTS

| CA | 2 461 067 | 9/2005 |
| CN | 1133072 | 10/1996 |

(Continued)

OTHER PUBLICATIONS

Extended European Search Report dated Sep. 27, 2017 in corresponding European Application No. 15768905.0.
(Continued)

*Primary Examiner* — Xiuyu Tai
(74) *Attorney, Agent, or Firm* — Wenderoth, Lind & Ponack, L.L.P.

(57) ABSTRACT

It is an object of the present invention is to provide an electrodeposition coating composition and an electrodeposition coating method that enable the formation of a cured electrodeposition coating film that develops excellent throwing power and exhibits a good appearance. An electrodeposition coating composition of the present invention comprising:
at least one compound (A) selected from the group consisting of a zinc compound (A-1) and a bismuth compound (A-2);
an aminated resin (B); and
a curing agent (C),
wherein
(Continued)

a milligram equivalent (MEQ (A)) of an acid per 100 g of a resin solid content in the composition is 27 or more;

a coulombic efficiency of the composition is 30 mg/C or less;

a film resistance of a 15-μm-thick uncured electrodeposition coating film formed using the composition is 400 kΩ·cm$^2$ or more; and a coating film viscosity of an electrodeposition coating film obtained from the composition is 3000 Pa·s or less at 50° C.

6 Claims, 1 Drawing Sheet (51) Int. Cl.
| | |
|---|---|
| *C09D 201/00* | (2006.01) |
| *C08G 59/50* | (2006.01) |
| *C09D 175/02* | (2006.01) |
| *C08G 18/80* | (2006.01) |
| *C08G 59/18* | (2006.01) |
| *C08G 18/58* | (2006.01) |
| *C09D 5/08* | (2006.01) |
| *C09D 175/04* | (2006.01) |
| *C25D 13/06* | (2006.01) |
| *C25D 13/10* | (2006.01) |
| *C25D 13/16* | (2006.01) |
| *C08K 3/22* | (2006.01) |
| *C08K 3/24* | (2006.01) |
| *C08K 3/10* | (2018.01) |

(52) U.S. Cl.
CPC ....... *C08G 18/8077* (2013.01); *C08G 59/184* (2013.01); *C08G 59/50* (2013.01); *C09D 5/08* (2013.01); *C09D 5/443* (2013.01); *C09D 5/4457* (2013.01); *C09D 163/00* (2013.01); *C09D 175/02* (2013.01); *C09D 175/04* (2013.01); *C09D 201/00* (2013.01); *C25D 13/06* (2013.01); *C25D 13/10* (2013.01); *C08K 3/10* (2013.01); *C08K 3/24* (2013.01); *C08K 2003/2296* (2013.01); *C25D 13/16* (2013.01)

(58) Field of Classification Search
CPC .. C09D 175/02; C09D 175/04; C09D 201/00; C09D 133/14; C09D 5/4492; C09D 5/084; C09D 7/61; C09D 5/4453; C09D 5/4438; C09D 5/4465; C09D 5/448; C09D 5/4446; C09D 7/40; C09D 5/4473; C08G 18/584; C08G 18/8074; C08G 18/8077; C08G 59/184; C08G 59/50; C08G 59/08; C08G 18/283; C08G 18/581; C08G 18/8064; C08G 18/08; C25D 13/06; C25D 13/10; C25D 13/16; C25D 13/22; C25D 13/20; C25D 9/02; C25D 13/04; C08K 3/10; C08K 3/24; C08K 2003/2296; Y10T 428/31511; Y10T 428/31529

See application file for complete search history.

(56) References Cited

U.S. PATENT DOCUMENTS

| | | | |
|---|---|---|---|
| 8,097,664 B2 | 1/2012 | Nishiguchi et al. | |
| 2001/0008692 A1* | 7/2001 | Shirakawa | C08G 18/283 428/413 |
| 2006/0201821 A1 | 9/2006 | Toi et al. | |
| 2007/0149655 A1* | 6/2007 | Kawaraya | C08G 18/584 523/458 |
| 2009/0321270 A1* | 12/2009 | Uchidoi | C09D 133/14 205/317 |
| 2011/0062026 A1* | 3/2011 | Nishiguchi | C09D 5/4438 205/50 |
| 2014/0042031 A1* | 2/2014 | Okada | C09D 5/44 205/50 |
| 2014/0124375 A1 | 5/2014 | Takegawa et al. | |
| 2014/0197039 A1 | 7/2014 | Inbe et al. | |

FOREIGN PATENT DOCUMENTS

| | | |
|---|---|---|
| CN | 101987938 | 3/2011 |
| EP | 2 708 583 | 3/2014 |
| EP | 2 754 701 | 7/2014 |
| JP | 2004-269627 | 9/2004 |
| JP | 2006-348316 | 12/2006 |
| JP | 2010-37481 | 2/2010 |
| JP | 2010-95678 | 4/2010 |
| JP | 2011-84729 | 4/2011 |
| JP | 2013-56961 | 3/2013 |
| WO | 2012/153850 | 11/2012 |
| WO | 2013/035765 | 3/2013 |

OTHER PUBLICATIONS

International Search Report dated May 26, 2015 in International Application No. PCT/JP2015/055804.

International Preliminary Report on Patentability dated Sep. 27, 2016 in International Application No. PCT/JP2015/055804.

* cited by examiner

ELECTRODEPOSITION COATING COMPOSITION AND ELECTRODEPOSITION COATING METHOD

TECHNICAL FIELD

The present invention relates to an electrodeposition coating composition and an electrodeposition coating method that enable the formation of a cured electrodeposition coating film exhibiting excellent throwing power and having a good appearance.

BACKGROUND ART

Cationic electrodeposition coating is a coating method performed by dipping an article to be coated as a cathode in a cationic electrodeposition coating composition and applying a voltage across the electrodes. This method is widely put to practical use as a coating method particularly for undercoating a large article to be coated having a complex shape, such as automobile bodies, because even an article to be coated having a complex shape can be coated in detail and can also be coated automatically and continuously. Moreover, the electrodeposition coating can impart high corrosion resistance to an article to be coated, producing a good effect on the protection of an article to be coated.

The article to be coated, which may be subjected to cationic electrodeposition coating, is usually subjected to chemical conversion treatment prior to the electrodeposition coating. This chemical conversion treatment can improve properties such as corrosion resistance and adhesiveness to the coating film. A zinc phosphate chemical conversion treatment agent is widely used as the chemical conversion treatment agent to be used in such treatment. However, the zinc phosphate chemical conversion treatment agent is a very reactive treatment agent having a high metal ion concentration and a high acid concentration, and therefore has drawbacks that it is poor in economy and workability in effluent treatment. Moreover, in the metal surface treatment using the zinc phosphate chemical conversion treatment agent, salts insoluble in water are produced and precipitated in the form of a deposit. Such a deposit is generally called a sludge. In the case where the zinc phosphate chemical conversion treatment agent is used, there is a problem concerning such a cost required to remove and dispose the sludge produced in the coating process. Moreover, there is a case where phosphate ions contained in the zinc phosphate chemical conversion treatment agent cause environmental eutrophication, and there is therefore a fear of environmental burden. Accordingly, the zinc phosphate chemical conversion treatment agent poses a problem that it requires a considerable labor in the effluent treatment. Moreover, in the metal surface treatment using the zinc phosphate chemical conversion treatment agent, it is necessary to perform surface control, giving rise to a problem concerning extension of process steps.

A chemical conversion treatment method using a zirconium chemical conversion treatment agent can be given as an example of a method capable of avoiding the aforementioned problem caused by the zinc phosphate chemical conversion treatment agent. The use of the zirconium chemical conversion treatment agent has an advantage that the discharge of phosphate ions can be avoided, and the amount of sludge to be produced can be reduced. However, the thickness of the chemical conversion treatment film formed with the zirconium chemical conversion treatment agent is generally as small as about $1/10$ to $1/30$ that of a chemical conversion treatment film formed with a zinc phosphate chemical conversion treatment agent. In addition, when the thickness of the chemical conversion treatment film formed with the zirconium chemical conversion treatment agent is so small as described above, there is a problem as to deterioration in the appearance of the obtained cured electrodeposition coating film. In addition, the small thickness of the chemical conversion treatment film causes deteriorated throwing power of the electrodeposition coating composition. As used herein, the term "throwing power" means the characteristics that a coating film is formed sequentially on an uncoated part of an article to be coated. Deterioration in throwing power has a problem of deterioration in the characteristics that a coating film is formed on all over the article to be coated in electrodeposition coating. The problem of deteriorated throwing power can be a large problem because high throwing power is required in chemical conversion treatment and electrodeposition coating which are performed as undercoating.

A technique for reducing the neutralization percentage of a resin emulsion and the like contained in an electrodeposition coating composition can be given as an example of a measure for improving the throwing power of the electrodeposition coating composition. A decrease in neutralization percentage has an advantage that a coating film precipitates at an early stage and electric resistance is rapidly developed at the precipitated part of the coating film, thereby improving the throwing power. On the other hand, the rapid development of electric resistance at the precipitated part of the coating film causes excess flow of a current, and there is therefore a fear of generation of gas pinholes. In other words, there is a conflicting relationship between the improvement in throwing power and the restriction of the generation of gas pinholes (gas pinhole properties) in the electrodeposition coating composition, and it has been technically difficult to make these properties compatible.

It is generally known that proper throwing power can be imparted by controlling the electrical conductivity of a coating material to an adequate value. There is disclosed JP-A-2004-269627 (Patent Document 1) as a patent document referring to the electrical conductivity and throwing power of a coating composition. However, this cationic electrodeposition coating composition has insufficient compatibility between the throwing power and the gas pinhole properties. This electrodeposition coating composition also contains a sulfonium-modified epoxy resin and differs in coating composition from the electrodeposition coating composition of the present invention.

It has been investigated so far to improve corrosion resistance by adding metal components to an electrodeposition coating composition. For example, JP-A-2011-84729 (Patent Document 2) discloses a cationic electrodeposition coating composition containing an amino group-containing modified epoxy resin (A), a blocked polyisocyanate curing agent (B), a metal compound (C), and nitrogen oxide ions (E), the cationic electrodeposition coating composition containing the metal compound (C) in an amount of 10 to 10,000 ppm in terms of mass of metal element, and containing the nitrogen oxide ions (E) in an amount of 50 to 10,000 ppm based on the mass of the cationic electrodeposition coating composition. On the other hand, the addition of the metal components to an electrodeposition coating composition increases the electrical conductivity of the electrodeposition coating composition, and also increases the viscosity of the electrodeposition coating film. If the electrical conductivity of the electrodeposition coating composition is increased and the viscosity of the electrodeposition coating film is increased, there are problems that coating film appearance failures such as gas pinholes are generated in electrodeposition coating.

PRIOR ART DOCUMENTS

Patent Documents

Patent Document 1: JP-A-2004-269627
Patent Document 2: JP-A-2011-84729

SUMMARY OF INVENTION

Problems to be Solved by the Invention

The present invention is intended to solve the aforementioned problems of conventional techniques, and it is an object of the present invention is to provide an electrodeposition coating composition and an electrodeposition coating method that enable the formation of a cured electrodeposition coating film that develops excellent throwing power and exhibits a good appearance.

Means for Solving the Problems

The present invention provides the following aspects to solve the aforementioned problems.

[1] An electrodeposition coating composition containing:
at least one compound (A) selected from the group consisting of a zinc compound (A-1) and a bismuth compound (A-2);
an aminated resin (B); and
a curing agent (C),
wherein
a milligram equivalent (MEQ (A)) of an acid per 100 g of a resin solid content in the electrodeposition coating composition is 27 or more;
a coulombic efficiency of the electrodeposition coating composition is 30 mg/C or less;
a film resistance of a 15-μm-thick uncured electrodeposition coating film formed using the electrodeposition coating composition is 400 kΩ·cm$^2$ or more; and
a coating film viscosity of an electrodeposition coating film obtained from the electrodeposition coating composition is 3000 Pa·s or less at 50° C.

[2] The electrodeposition coating composition, wherein the composition contains an emulsion obtained by neutralizing a resin emulsion containing the aminated resin (B) and the curing agent (C) with one or more acids selected from the group consisting of methanesulfonic acid, sulfamic acid, lactic acid, and dimethylolpropionic acid.

[3] The electrodeposition coating composition, wherein the aminated resin (B) is a resin obtained by reacting an amine compound with a resin obtained by reacting a bisphenol A alkylene oxide adduct (b-1), an epoxy resin (b-2), and a bisphenol compound (b-3).

[4] The electrodeposition coating composition, wherein the bismuth compound (A-2) contains bismuth ions and at least one member selected from the group consisting of lactic acid, dimethylolpropionic acid, and amino acid; and the bismuth compound has a water-dispersed colloid form.

[5] The electrodeposition coating composition, wherein the composition contains substantially neither an organotin compound nor an organolead compound.

[6] An electrodeposition coating method including dipping an article to be coated after being subjected to zirconium chemical conversion treatment in an electrodeposition coating composition to form an electrodeposition coating film, and heating the obtained electrodeposition coating film to form a cured electrodeposition coating film, wherein
the electrodeposition coating composition is the aforementioned electrodeposition coating composition.

[7] A method of improving an appearance of a cured electrodeposition coating film in electrodeposition coating including dipping an article to be coated after being subjected to zirconium chemical conversion treatment in an electrodeposition coating composition to form an electrodeposition coating film, and heating the obtained electrodeposition coating film to form a cured electrodeposition coating film, wherein
the electrodeposition coating composition is the aforementioned electrodeposition coating composition.

In this description, an uncured electrodeposition coating film prior to baking curing is referred to as "electrodeposition coating film," and a coating film after the baking curing is referred to as "cured electrodeposition coating film."

Effects of the Invention

The electrodeposition coating composition of the present invention has a feature that it exhibits excellent throwing power and enables the preparation of a cured electrodeposition coating film having a good appearance. The electrodeposition coating composition of the present invention has the characteristics that even in the case where an article to be coated provided with a thin chemical conversion treatment film formed with, for example, a zirconium chemical conversion treatment agent is subjected to electrodeposition coating, a cured electrodeposition coating film having a good appearance can be obtained similarly to the case of coating an article to be coated treated with a zinc phosphate chemical conversion treatment agent. The electrodeposition coating composition of the present invention has the characteristics that it is improved in both throwing power and restriction of the generation of gas pinholes, which are incompatible with each other.

MODE FOR CARRYING OUT THE INVENTION

The electrodeposition coating composition of the present invention contains:
at least one compound (A) selected from the group consisting of a zinc compound (A-1) and a bismuth compound (A-2);
an aminated resin (B); and
a curing agent (C).
Each component will be described below in detail.
Zinc Compound (A-1) and Bismuth Compound (A-2)

The electrodeposition coating composition of the present invention contains at least one compound (A) selected from the group consisting of a zinc compound (A-1) and a bismuth compound (A-2). A zinc salt, that is, a zinc compound having a counter ion to a zinc ion is preferably used as the zinc compound (A-1). Examples of the zinc salt preferably used as the zinc compound (A-1) include zinc salts having, as a counter ion, at least one member selected from the group consisting of inorganic acids, organic acids, and amino acids, for example, inorganic acids such as nitric acid and phosphoric acid; organic acids such as lactic acid, acetic acid, methanesulfonic acid, formic acid, dimethylolpropionic acid, and gluconic acid; and amino acids (for example, glycine and aspartic acid).

It is preferable to use at least one member selected from the group consisting of zinc methanesulfonate and zinc acetate as the zinc compound (A-1).

As the bismuth compound (A-2), it is more preferable to use a bismuth salt, that is, a bismuth compound having a counter ion to a bismuth ion. Examples of the bismuth salt preferably used as the bismuth compound (A-2) include bismuth salts having, as a counter ion, at least one member selected from the group consisting of inorganic acids, organic acids, and amino acids, for example, inorganic acids such as nitric acid and phosphoric acid; organic acids such as lactic acid, acetic acid, methanesulfonic acid, formic acid, dimethylolpropionic acid, and gluconic acid; and amino acids (for example, glycine and aspartic acid).

It is more preferable to use at least one member selected from the group consisting of bismuth lactate, bismuth dimethylolpropionate, and glycine-containing bismuth lactate as the bismuth compound (A-2).

The bismuth compound (A-2) preferably has a water-dispersed colloid form. The water-dispersed colloid of the bismuth compound (A-2) may be prepared by blending bismuth oxide and/or bismuth hydroxide, the above organic acid, and, as necessary, the above amino acid in an aqueous solvent. This has an advantage that the curability of the electrodeposition coating composition is improved, and the appearance of the obtained cured electrodeposition coating film is also improved.

The electrodeposition coating composition of the present invention contains at least one compound (A) selected from the group consisting of the zinc compound (A-1) and the bismuth compound (A-2) preferably in an amount of 0.001 to 1 part by mass, more preferably 0.01 to 0.5 parts by mass based on 100 parts by mass of the electrodeposition coating composition. When either one of the zinc compound (A-1) and the bismuth compound (A-2) is contained, the amount of either of the compounds to be contained preferably falls within the above range. When both of the zinc compound (A-1) and the bismuth compound (A-2) are contained, the total amount of the compounds preferably falls within the above range.

The electrodeposition coating composition of the present invention contains at least one compound (A) selected from the group consisting of the zinc compound (A-1) and the bismuth compound (A-2), whereby there is an advantage that the electrodeposition coating composition has excellent heat curability even in the case where an organotin compound, for example, an organotin curing catalyst is not contained. On the other hand, the present invention does not wholly preclude an electrodeposition coating composition containing an organotin compound, and an organotin compound may be used as necessary.

Aminated Resin (B)

The electrodeposition coating composition of the present invention contains an aminated resin (B). This aminated resin (B) is a coating film-forming resin constituting a cured electrodeposition coating film that is obtained by coating with the electrodeposition coating composition of the present invention. A cation-modified epoxy resin obtained by modifying an oxirane ring in the resin skeleton with an amine compound is desirable as the aminated resin (B). Generally, a cation-modified epoxy resin is prepared by opening an oxirane ring in a starting material resin molecule through a reaction with an amine compound such as a primary amine, secondary amine, or tertiary amine, and/or an acid salt thereof. Typical examples of the starting material resin may include polyphenol polyglycidyl ether type epoxy resins that are reaction products of polycyclic phenol compounds such as bisphenol A, bisphenol F, bisphenol S, phenol novolac, and cresol novolac, and epichlorohydrin. Other examples of the starting material resin may include an oxazolidone ring-containing epoxy resin described in JP-A-5-306327. These epoxy resins may be prepared by the reaction between epichlorohydrin and a bisurethane compound obtained by blocking a diisocyanate compound or an isocyanate group of a diisocyanate compound with a lower alcohol such as methanol and ethanol.

The starting material resin may be treated for use for chain extension by using bifunctional polyester polyol, polyether polyol, bisphenols, or dibasic carboxylic acid prior to the opening reaction of an oxirane ring using an amine compound. In addition, a monohydroxy compound such as 2-ethylhexanol, nonylphenol, ethylene glycol mono-2-ethylhexyl ether, ethylene glycol mono-n-butyl ether, or propylene glycol mono-2-ethylhexyl ether may be added to a part of oxirane rings for the purpose of controlling the molecular weight or amine equivalent and improving heat flow characteristics prior to the opening reaction of the oxirane ring with an amine compound.

An oxirane ring in the resin is opened by reacting an amine compound with the resin in the aforementioned manner, whereby an amino group is introduced. Examples of such an amine compound may include primary, secondary, and tertiary amines such as butylamine, octylamine, diethylamine, dibutylamine, methylbutylamine, monoethanolamine, diethanolamine, N-methylethanolamine, triethylamine, N,N-dimethylbenzylamine, and N,N-dimethylethanolamine, and/or acid salts thereof. In addition, ketimine block primary amino group-containing secondary amines such as aminoethylethanolamine methylisobutylketimine, and diethylenetriamine diketimine may be used. It is necessary to react these amine compounds at least equimolarly with the oxirane ring to open all the oxirane rings.

The aminated resin (B) of the present invention is preferably a resin obtained by reacting an amine compound with a resin obtained by reacting a bisphenol A alkylene oxide adduct (b-1), an epoxy resin (b-2), and a bisphenol compound (b-3).

Examples of the bisphenol A alkylene oxide adduct (b-1) include compounds obtained by adding 1 to 40 mol of an alkylene oxide to 1 mol of bisphenol A. Examples of the alkylene oxide include ethylene oxide and propylene oxide. The addition reaction of the alkylene oxide with bisphenol A may be performed according to a reaction usually used by a person skilled in the art.

A commercially available product may be used as the bisphenol A alkylene oxide adduct (b-1). Examples of the commercially available product include NEWPOL BP-2P, NEWPOL BP-3P, NEWPOL BP-23P, and NEWPOL BP-5P which are bisphenol A propylene oxide adducts, and NEWPOL BPE-20T, NEWPOL BPE-20, NEWPOL BPE-100, NEWPOL BPE-180, NEWPOL BPE-40, and NEWPOL BPE-60 which are bisphenol A ethylene oxide adducts (all the products are manufactured by Sanyo Chemical Industries, Ltd.).

Examples of the epoxy resin (b-2) include polyphenol polyglycidyl ether type epoxy resins which are reaction products of polycyclic phenol compounds such as bisphenol A, bisphenol F, bisphenol S, phenol novolac, and cresol novolac, and epichlorohydrin. The epoxy resin (b-2) preferably has an epoxy equivalent of 150 to 500 g/eq, more preferably 160 to 300 g/eq.

Examples of the bisphenol compound (b-3) include bisphenol A, bisphenol F, bisphenol AP, bisphenol AF, bisphenol B, bisphenol BP, bisphenol C, bisphenol E, bisphenol G, bisphenol M, bisphenol S, and bisphenol P. As the bisphenol compound (b-3), bisphenol A or bisphenol F is preferable, and bisphenol A is particularly preferable.

The reaction of the bisphenol A alkylene oxide adduct (b-1), the epoxy resin (b-2), and the bisphenol compound (b-3) may be performed by any method that is usually used. Examples of the reaction method include a method in which these components (b-1), (b-2), and (b-3) are mixed at once and reacted, and a method in which these components are sequentially blended in an arbitrary combination and an arbitrary order and reacted. These components are preferably used in the following ratio: the bisphenol A alkylene oxide adduct (b-1), 10 to 80% by mass, preferably 15 to 75% by mass; the epoxy resin (b-2), 20 to 80% by mass, preferably 30 to 75% by mass; and the bisphenol compound (b-3), 5 to 50% by mass, preferably 7 to 30% by mass.

The aforementioned amine compound may be used as the amine compound to be reacted with the resin obtained by reacting the bisphenol A alkylene oxide adduct (b-1), the epoxy resin (b-2), and the bisphenol compound (b-3).

The resin obtained by reacting the resin obtained by the reaction of the bisphenol A alkylene oxide adduct (b-1), the epoxy resin (b-2), and the bisphenol compound (b-3) with the amine compound has an alkylene oxide structure in the resin skeleton. This allows a resin component to fuse in the electrodeposition coating film even in a state where the electrodeposition coating film is uncured. Then, this results in suppressed flow of excess current at a part where the coating film precipitates, so that the generation of coating failures such as gas pinholes is suppressed, bringing about such an advantage that the appearance of the cured electrodeposition coating film to be obtained is improved.

The number average molecular weight of the aminated resin (B) is preferably 1,000 to 5,000. When the number average molecular weight is 1,000 or more, the physical properties such as solvent resistance and corrosion resistance of the obtained cured electrodeposition coating film are improved. On the other hand, when the number average molecular weight is 5,000 or less, the viscosity of the aminated resin can be easily controlled, enabling smooth synthesis, and moreover, the emulsification and dispersion of the obtained aminated resin (B) are performed easily. The number average molecular weight of the aminated resin (B) is more preferably in a range from 1,600 to 3,200.

In this description, the number average molecular weight is a number average molecular weight in terms of polystyrene which is measured by gel permeation chromatography (GPC).

The amine value of the aminated resin (B) is preferably in a range from 20 to 100 mg KOH/g. When the amine value of the aminated resin (B) is 20 mg KOH/g or more, the emulsification and dispersion stability of the aminated resin (B) in the electrodeposition coating composition is improved. When the amine value is 100 mg KOH/g or less, the quantity of amino groups in the cured electrodeposition coating film is adequate, and there is therefore no fear of deterioration in the water resistance of the coating film. The amine value of the aminated resin (B) is more preferably in a range from 20 to 80 mg KOH/g.

The hydroxyl value of the aminated resin (B) is preferably in a range from 50 to 400 mg KOH/g. When the hydroxyl value of the aminated resin (B) is 50 mg KOH/g or more, the cured electrodeposition coating film is well cured. On the other hand, when the hydroxyl value is 400 mg KOH/g or less, the amount of hydroxyl groups remaining in the cured electrodeposition coating film is appropriate, and there is therefore no fear of deterioration in the water resistance of the coating film. The hydroxyl value of the aminated resin (B) is more preferably in a range from 100 to 300 mg KOH/g.

The use of the aminated resin (B) having a number average molecular weight of 1,000 to 5,000, an amine value of 20 to 100 mg KOH/g, and a hydroxyl value of 50 to 400 mg KOH/g in the electrodeposition coating composition of the present invention has an advantage that excellent corrosion resistance can be imparted to an article to be coated.

The electrodeposition coating composition of the present invention contains at least one compound (A) selected from the group consisting of the zinc compound (A-1) and the bismuth compound (A-2). In an electrodeposition coating composition containing such a metal compound, weak interaction takes place between the metal component and polar functional groups such as a hydroxyl group and/or an amino group in a resin component. This intermolecular interaction increases the electric resistance of the coating film and improves throwing power without any outstanding rise in the viscosity of the precipitated uncured coating film. The present invention has, on the other hand, a feature that a coating film viscosity of an uncured electrodeposition coating film itself obtained from the electrodeposition coating composition is controlled to 3000 Pa·s or less at 50° C. by controlling the characteristics of the aminated resin (B) and the resin emulsion containing the aminated resin (B) and the curing agent (C). Specifically, this ensures the property necessary for throwing power, that is, the electric resistance of the coating film when initial electrodeposition precipitation occurs, and the compatibility between the throwing power and flow characteristics that control the appearance of the coating film after baking, that is, low viscosity of the uncured coating film.

As a measure for controlling the coating film viscosity to 3000 Pa·s or less, there can be mentioned a method in which the number average molecular weight of the aminated resin (B) is preferably adjusted in a range from 1,600 to 3,200, more preferably 1,600 to 2,800, even more preferably 2,000 to 2,800. It is found in the present invention that when the number average molecular weight of the aminated resin (B) is adjusted to be within the above range, the coating film viscosity can be largely decreased.

As another measure for controlling the coating film viscosity to 3000 Pa·s or less, there is a method in which the hydroxyl value of the aminated resin (B) is controlled. It was found that the coating film viscosity can be controlled within a proper range preferably by adjusting, for example, the hydroxyl value of the aminated resin (B) to 180 to 270 mg KOH/g, more preferably 200 to 250 mg KOH/g. In this aspect, the number of hydroxyl groups contained in the aminated resin (B) is so small that the hydroxyl value of the aminated resin (B) is in a range from 180 to 270 mg KOH/g. When the number of hydroxyl groups of the aminated resin (B) is small, the interaction between the aminated resin and the metal compound (A) in the electrodeposition coating film may be reduced, with the result that the coating film viscosity before curing is decreased.

It is to be noted that the aminated resin (B) may contain an amino group-containing acrylic resin, an amino group-containing polyester resin, and the like as necessary.

The aminated resin (B) may be a combination of aminated resins differing in amine value and/or hydroxyl value as necessary. When two or more types of aminated resins differing in amine value and hydroxyl value are combined, the average amine value and the average hydroxyl value calculated based on the mass ratio among the aminated resins to be used are preferably within the above ranges. In addition, it is preferable to use, as the aminated resins (B) to be combined, a combination of an aminated resin having an amine value of 20 to 50 mg KOH/g and a hydroxyl value of 50 to 300 mg KOH/g and an aminated resin having an amine value of 50 to 200 mg KOH/g and a hydroxyl value of 200 to 500 mg KOH/g. The use of this combination has an advantage that excellent corrosion resistance can be imparted because the core part of the emulsion is made more hydrophobic and the shell part of the emulsion is made more hydrophilic.

Curing Agent (C)

The electrodeposition coating composition of the present invention contains the curing agent (C). Preferable examples of the curing agent (C) include a blocked isocyanate curing agent from the viewpoint of storage stability and coating performance. This curing agent (C) is a coating film-forming resin constituting an electrodeposition coating film. At least one curing agent selected from the group consisting of organic curing agents such as a melamine resin and a phenol resin, silane coupling agents, and metal curing agents may be combined as the curing agent. A blocked isocyanate curing agent preferable as the curing agent (C) may be prepared by blocking a polyisocyanate with a sealant.

Examples of the polyisocyanate include aliphatic diisocyanates such as hexamethylene diisocyanate (including trimers), tetramethylene diisocyanate, and trimethylhexamethylene diisocyanate, alicyclic polyisocyanates such as isophorone diisocyanate and 4,4'-methylenebis(cyclohexylisocyanate), and aromatic diisocyanates such as 4,4'-diphenylmethane diisocyanate, tolylene diisocyanate and xylylene diisocyanate.

As examples of the sealant, monohydric alkyl (or aromatic) alcohols such as n-butanol, n-hexyl alcohol, 2-ethylhexanol, lauryl alcohol, phenol carbinol, and methylphenyl carbinol; cellosolves such as ethylene glycol monohexyl ether and ethylene glycol mono-2-ethylhexyl ether; polyether type both-terminal diols such as polyethylene glycol, polypropylene glycol, and polytetramethylene ether glycol phenol; polyester type both-terminal polyols obtained from diols such as ethylene glycol, propylene glycol, and 1,4-butanediol and dicarboxylic acids such as oxalic acid, succinic acid, adipic acid, suberic acid, and sebacic acid; phenols such as para-t-butylphenol and cresol; oximes such as dimethyl ketoxime, methylethyl ketoxime, methylisobutyl ketoxime, methylamyl ketoxime, and cyclohexanone oxime; and lactams represented by ε-caprolactam and γ-butyrolactam are preferably used.

The blocking rate of the blocked isocyanate curing agent is preferably 100%. This has an advantage that the storage stability of the electrodeposition coating composition is improved.

The blocked isocyanate curing agent preferably used as the curing agent (C) preferentially reacts with a primary amine of the aminated resin (B), and further with a hydroxyl group to cure. It is considered that, in the cured electrodeposition coating film obtained after the aminated resin (B) is reacted with the blocked isocyanate curing agent by heat curing, the remaining hydroxyl groups derived from the aminated resin (B) improve the adhesiveness between an article to be coated and an electrodeposition coating film.

Plasticizer

The electrodeposition coating composition of the present invention preferably contains a plasticizer. The zinc compound (A-1) and the bismuth compound (A-2) contained in the electrodeposition coating composition are incorporated into the electrodeposition coating film. These metal components in the electrodeposition coating film form hydrogen bonds with a coating film-forming resin. Along with the formation of hydrogen bonds, internal stress in the coating film tends to be increased, and the coating film tends to be harder. Accordingly, the electrodeposition coating composition is made to contain a plasticizer, whereby the internal stress can be reduced to improve the plasticity of the electrodeposition coating film. The plasticizer is preferably an alkylene oxide adduct. Among these alkylene oxide adducts, an ethylene oxide adduct and a propylene oxide adduct are more preferable. No particular limitation is imposed on the addition method. Examples of these adducts include ethylene oxide adducts of bisphenol A or an alcohol, cresol propylene oxide adducts, propylene oxide adducts, diethylenetriamine propylene oxide adducts, and reaction products of a diethylenetriamine propylene oxide adduct and an epoxy resin.

When the plasticizer is contained, the amount of the plasticizer is preferably 0.1 to 25% by mass, more preferably 1 to 10% by mass based on the total solid of the coating film-forming resin contained in the electrodeposition coating composition.

Chelating Acid

The electrodeposition coating composition of the present invention preferably contains a chelating acid. Examples of the chelating acid include at least one member selected from the group consisting of sulfonic acid, an organic phosphonic acid, an organic carboxylic acid, amino acid, an aminocarboxylic acid, a sugar acid, and a carboxyl group-containing vinyl resin. When the chelating acid is contained in the electrodeposition coating composition of the present invention, there is an advantage that the electrical conductivity is decreased, and the appearance of a coating film obtained by electrodeposition coating is improved, enabling the formation of a cured electrodeposition coating film having high corrosion resistance.

Examples of the sulfonic acid as the chelating acid include alkanesulfonic acids having 1 to 20 carbon atoms, phenolsulfonic acid, and aminosulfonic acid. The C1-C20 alkyl group which forms these sulfonic acids may have a substituent such as a hydroxyl group. Preferable examples of the sulfonic acid include methanesulfonic acid, sulfamic acid, phenolsulfonic acid, p-toluenesulfonic acid, aminosulfonic acid, and 2-acrylamido-2-methylpropanesulfonic acid (AMPS).

Examples of the organic phosphonic acid as the chelating acid include alkylphosphonic acids having 1 to 20 carbon atoms, alkyl bisphosphonic acids having 1 to 20 carbon atoms, aromatic phosphonic acids having 6 to 20 carbon atoms, and aromatic bisphosphonic acids having 6 to 20 carbon atoms. The C1-C20 alkyl group and the C6-C20 aromatic group which form these phosphonic acids may have a substituent such as a hydroxyl group. Preferable examples of the organic phosphonic acid include 1-hydroxyethylidenebisphosphonic acid.

Examples of the organic carboxylic acid as the chelating acid include fatty acids having 3 to 20 carbon atoms, aromatic carboxylic acids having 6 to 20 carbon atoms, oxocarboxylic acids having 2 to 20 carbon atoms, dicarboxylic acids having 3 to 20 carbon atoms, and other organic carboxylic acids. As used herein, the "organic carboxylic acid" does not include aminocarboxylic acids which will be explained later.

Examples of the fatty acids having 3 to 20 carbon atoms include propionic acid, butyric acid, dimethylolpropionic acid (DMPA), isobutyric acid, valeric acid, isovaleric acid, caproic acid, enanthic acid, caprylic acid, pelargonic acid, capric acid, lauric acid, myristic acid, pentadecylic acid, palmitic acid, margaric acid, stearic acid, and oleic acid.

Examples of the aromatic carboxylic acids having 6 to 20 carbon atoms include salicylic acid, gallic acid, benzoic acid, phthalic acid, and cinnamic acid.

Examples of the oxocarboxylic acids having 2 to 20 carbon atoms, dicarboxylic acids having 3 to 20 carbon atoms, and other organic carboxylic acids include pyruvic acid, oxalic acid, lactic acid, tartaric acid, maleic acid, fumaric acid, malonic acid, succinic acid, malic acid, citric acid, aconitic acid, glutaric acid, and adipic acid. Among these acids, dimethylolpropionic acid and lactic acid are preferable.

Examples of the amino acid as the chelating acid include aspartic acid, glutamic acid, glycine, alanine, valine, leucine, isoleucine, serine, threonine, cysteine, methionine, asparagine, glutamine, proline, phenylalanine, tyrosine, and tryptophan. Among these acids, aspartic acid and glycine are preferable.

The aminocarboxylic acid as the chelating agent is an acid having an amino group and a carboxyl group in its molecule, and is a compound other than the aforementioned amino acids. Examples of the aminocarboxylic acid include hydroxyethylethylenediaminetriacetic acid (HEDTA), nitrilotriacetic acid (NTA), diethylenetriaminepentaacetic acid (DPTA), and triethylenetetraminehexaacetic acid.

The sugar acid as the chelating acid is a sugar derivative having a carboxyl group, and is obtained by oxidizing a monosaccharide. Examples of the sugar acid include aldonic acids (for example, gluconic acid, galactonic acid, and mannoic acid), uronic acids (for example, glucuronic acid, galacturonic acid, and mannuronic acid), aldaric acids (for example, glucaric acid, galactaric acid, and mannaric acid), iduronic acid, glyceric acid, sialic acid, threonic acid, pangamic acid, ascorbic acid, muramic acid, and lactobionic acid.

Examples of the carboxyl group-containing vinyl resin as the chelating acid include a carboxyl group-containing polyvinyl alcohol resin. The carboxyl group-containing polyvinyl alcohol resin may be produced according to, for example, a method in which a vinyl acetate monomer is copolymerized with a monomer of, for example, acrylic acid, and then the obtained polyvinyl acetate is hydrolyzed in the procedures for preparing polyvinyl alcohol.

Among these chelating acids, it is more preferable to use at least one member selected from the group consisting of alkanesulfonic acid, an organic phosphonic acid, an organic carboxylic acid, and amino acid, and it is particularly preferable to use at least one member selected from the group consisting of methanesulfonic acid, dimethylolpropionic acid, and lactic acid from the viewpoint of the chelating function and reduction in the adverse influence of adsorption to the coating film.

In the case where the above chelating acid is contained in the present invention, the chelating acid is preferably contained in the electrodeposition coating composition in an amount of 0.1 to 10 equivalents, except for the amount of the acid used to neutralize the aminated resin, based on the amount of at least one compound (A) selected from the group consisting of the zinc compound (A-1) and the bismuth compound (A-2).

Other Components

Pigment

The electrodeposition coating composition of the present invention may contain a pigment usually used in electrodeposition coating compositions. Examples of the pigment include inorganic pigments and organic pigments which are usually used, for example, color pigments such as titanium white, carbon black, and red iron oxide; extender pigments such as kaolin, talc, aluminum silicate, calcium carbonate, mica, and clay; and antirust pigments such as iron phosphate, aluminum phosphate, calcium phosphate, aluminum tripolyphosphate, aluminum phosphomolybdate, and aluminum zinc phosphomolybdate. When these pigments are contained in the electrodeposition coating composition, the amount of the pigments is preferably 1 to 30% by mass based on a resin solid content of the electrodeposition coating composition.

When a pigment is used as the component of the electrodeposition coating composition, it is generally preferable to disperse the pigment in a high concentration in an aqueous solvent to form a paste (pigment dispersion paste) in advance. This is because it is difficult to disperse a pigment, by one step, in a uniform and low-concentration state which is usually adopted in the production of electrodeposition coating compositions, because the pigment has a powder form. Such a paste is generally called a pigment dispersion paste.

The pigment dispersion paste is prepared by dispersing a pigment together with a pigment dispersion resin in an aqueous solvent. As the pigment dispersion resin, a pigment dispersion resin having a cationic group, such as a modified epoxy resin having at least one member selected from the group consisting of a quaternary ammonium group, a tertiary sulfonium group, and a primary amine group, may be used. Ion exchange water or water containing a small amount of an alcohol is used as the aqueous solvent. Generally, the pigment dispersion resin is used in an amount of 20 to 100 parts by mass based on 100 parts by mass of the pigment in terms of resin solid content ratio. After the pigment dispersion resin is blended with the pigment, the pigment is dispersed using a usual dispersing machine such as a ball mill or a sand grind mill until the pigment in the mixture has a predetermined uniform particle diameter to give a pigment dispersion paste.

Other Additives

The electrodeposition coating composition of the present invention may contain, as necessary, additives that are generally used in the field of coating materials, for example, organic solvents such as ethylene glycol monobutyl ether, ethylene glycol monohexyl ether, ethylene glycol monoethylhexyl ether, propylene glycol monobutyl ether, dipropylene glycol monobutyl ether, and propylene glycol monophenyl ether, drying preventive agents, surfactants such as an antifoaming agent, viscosity modifiers such as acrylic resin microparticles, a cissing preventive agent, and inorganic rust preventive agents such as a vanadium salt, copper, iron, manganese, magnesium, and a calcium salt. The electrodeposition coating composition may also contain, besides these additives, known auxiliary complexing agents, buffering agents, smoothing agents, stress relaxation agents, glossing agents, semi-glossing agents, antioxidants, and UV absorbers according to the intended use.

Other Coating Film-Forming Resin Components

The electrodeposition coating composition of the present invention may contain, other than the aminated resin (B), an aminated resin that does not correspond to the aminated resin (B) such as those mentioned above, and/or other unaminated coating film-forming resin components. Examples of such other unaminated coating film-forming resin components include a urethane resin, a butadiene-based resin, a phenol resin, and a xylene resin. As the other coating film-forming resin components which may be contained in the electrodeposition coating composition, a phenol resin and a xylene resin are preferable. Examples of these phenol resin and xylene resin include xylene resins having 2 to 10 aromatic rings.

In this description, the term "resin solid content" means a solid content mass of all the solids of the coating film-forming resin contained in the electrodeposition coating composition. Specifically, the resin solid content means the total amount of the solid content mass of the aminated resin (B), the curing agent (C), and, as necessary, other coating film-forming resin components which are contained in the electrodeposition coating composition.

The resin solid content of the electrodeposition coating composition is preferably 1 to 30% by mass based on the electrodeposition coating composition. When the resin solid content of the electrodeposition coating composition is less than 1% by mass, the amount of the precipitated electrodeposition coating film may be reduced, and there is therefore a fear that it is difficult to secure sufficient corrosion resistance. When the resin solid content of the electrodeposition coating composition exceeds 30% by mass, there is a fear of deterioration in throwing power or appearance of the coating film.

Preparation of Electrodeposition Coating Composition

The electrodeposition coating composition to be used in the present invention may be prepared by mixing a resin emulsion containing the aminated resin (B) and the curing agent (C), the zinc compound (A-1) and/or the bismuth compound (A-2), the pigment dispersion paste as necessary, and a chelating acid and a plasticizer as necessary. The zinc compound (A-1) and the bismuth compound (A-2) may be added after they are combined with a pigment to form a dispersion paste.

The amount of the curing agent (C) is required to be sufficient to provide a good cured coating film by the reaction with active hydrogen-containing functional groups such as primary or secondary amino groups, and hydroxyl groups in the aminated resin (B) during curing. The amount of the curing agent (C) is preferably in a range from 90/10 to 50/50, more preferably in a range from 80/20 to 65/35 expressed by the solid content mass ratio of the aminated resin (B) to the curing agent (C) (aminated resin (B)/curing agent (C)). When the solid content mass ratio of the aminated resin (B) to the curing agent (C) is controlled, the fluidity and curing speed of the precipitated coating film can be controlled, and therefore, the coating film to be obtained can be improved in smoothness.

In the preparation of the electrodeposition coating composition, an emulsion improved in dispersibility can be formed by neutralizing the resin emulsion containing the aminated resin (B) and the curing agent (C) with a neutralizing acid. Examples of the neutralizing acid to be used for the neutralization of the resin emulsion containing the aminated resin (B) and the curing agent (C) include organic acids such as methanesulfonic acid, sulfamic acid, lactic acid, dimethylolpropionic acid, formic acid, acetic acid, and lactic acid. In the present invention, the resin emulsion containing the aminated resin (B) and the curing agent (C) is more preferably neutralized with one or more acids selected from the group consisting of methanesulfonic acid, sulfamic acid, lactic acid, and dimethylolpropionic acid. These acids are more preferable because an action of a chelating acid is obtained in addition to an action of a neutralizing acid.

In the preparation of the electrodeposition coating composition, an acid such as acetic acid or formic acid has been usually used as the neutralizing acid to be used for the neutralization of the resin emulsion containing the aminated resin (B) and the curing agent (C). On the other hand, the electrodeposition coating composition of the present invention contains the zinc compound (A-1) and the bismuth compound (A-2). Then, it was found that when acetic acid is used as the neutralizing acid for the resin emulsion in the electrodeposition coating composition containing these compounds, the cohesive force of the resin emulsion tends to be excessively large. Then, it was found in the present invention that the cohesive force of the resin emulsion can be controlled to improve throwing power by using one or more acids selected from the group consisting of methanesulfonic acid, sulfamic acid, lactic acid, and dimethylolpropionic acid as the neutralizing acid. It is more preferable to use one or more acids selected from the group consisting of methanesulfonic acid, sulfamic acid, and dimethylolpropionic acid as the neutralizing acid.

In the electrodeposition coating composition of the present invention, a total milligram equivalent (MEQ (A)) of all the acids is 27 or more per 100 g of the resin solid content of the electrodeposition coating composition. This MEQ (A) is preferably 27 to 45, more preferably 30 to 40. When the milligram equivalent (MEQ (A)) of acids in the electrodeposition coating composition of the present invention is within the above range, the cohesive force of the resin emulsion is controlled, and the viscosity of the electrodeposition coating film can be designed to be low. This has an advantage that the appearance of the coating film to be obtained is improved. Moreover, this also has an advantage that the throwing power is improved, with the result that excellent corrosion resistance is obtained.

The milligram equivalent (MEQ (A)) of an acid per 100 g of the resin solid content of the electrodeposition coating composition can be controlled by the amount of the neutralizing acid and the amount of acids added as necessary, such as a chelating acid.

As used herein, the MEQ (A) is an abbreviation of milligram equivalent (acid), and is the sum of milligram equivalents of all the acids per 100 g of the solid content of a coating material. The MEQ (A) may be measured by precisely weighing about 10 g of the electrodeposition coating composition, dissolving the composition in about 50 ml of a solvent (THF: tetrahydrofuran), and then performing potentiometric titration using a $1/10$ N NaOH solution to thereby quantitatively measure the amount of acids contained in the electrodeposition coating composition.

The neutralizing acid is preferably used in an amount of 10 to 100%, more preferably 20 to 70% in terms of ratio by equivalent of the neutralizing acid to the equivalent of amino groups of the aminated resin (B). In this description, the ratio by equivalent of the neutralizing acid to the equivalent of amino groups of the aminated resin is referred to as the neutralization percentage. When the neutralization percentage is 10% or more, the affinity to water is secured, improving water dispersibility.

The electrodeposition coating composition used in the present invention preferably contains substantially neither an organotin compound nor an organolead compound. In this description, the wording "the electrodeposition coating composition contains substantially neither an organotin compound nor an organolead compound" means that the concentration of the organolead compound contained in the electrodeposition coating composition does not exceed 50 ppm in terms of lead metal element and the concentration of the organotin compound does not exceed 50 ppm in terms of tin metal element. The electrodeposition coating composition of the present invention contains the zinc compound (A-1) and/or the bismuth compound (A-2). Accordingly, it is unnecessary to use an organolead compound or an organotin compound as a curing catalyst. This enables the preparation of an electrodeposition coating composition containing neither an organotin compound nor an organolead compound.

Even in the case where electrodeposition coating of an article treated with zirconium chemical conversion treatment agent or an untreated article are performed, the electrodeposition coating composition of the present invention can attain an appearance of the coating film that is not inferior to the appearance of the coating film obtained with electrodeposition coating of an article treated with a zinc phosphate chemical conversion treatment agent. Generally, the thickness of the chemical conversion treatment film formed with a chemical conversion treatment agent containing zirconium is as very small as about 1/10 to 1/30 that of the chemical conversion treatment film formed with a zinc phosphate chemical conversion treatment agent. Accordingly, when electrodeposition coating of an article to be coated formed with a zirconium chemical conversion treatment film is performed, coating film resistance is decreased even in a part where the electrodeposition coating film precipitates as compared with the case where a zinc phosphate chemical conversion treatment film is formed. This causes deteriorated throwing power. On the other hand, if the electric resistance of the part where the coating film precipitates is merely increased for the purpose of improving throwing power, this causes the generation of coating film defects such as gas pinholes.

The electrodeposition coating composition of the present invention, in contrast, contains at least one compound (A) selected from the group consisting of the zinc compound (A-1) and the bismuth compound (A-2) as mentioned above, and also has a milligram equivalent (MEQ (A)) of 27 or more per 100 g of the resin solid content of the electrodeposition coating composition. This ensures that a film resistance of a 15-μm-thick uncured electrodeposition coating film formed using the electrodeposition coating composition is 400 kΩ·cm² or more, preferably in a range from 400 to 1500 kΩ·cm². When the film resistance of the electrodeposition coating film satisfies the above requirements, the throwing power is improved. On the other hand, because the electrodeposition coating composition of the present invention has low coulombic efficiency, spark discharge of the generated hydrogen gas is scarcely caused when the electrodeposition coating film precipitates, and the generation of coating film defects such as gas pinholes is suppressed, ensuring that the appearance of the obtained cured electrodeposition coating film is improved.

The film resistance of the coating film is obtained by measuring the residual current (mA) at the final coating voltage (V) and performing the calculation according to the following formula.

$$\text{Film resistance (k}\Omega\cdot\text{cm}^2) = \text{Coating area (cm}^2) \times \text{Voltage (V)} / \text{Residual current (mA)}$$

A coulombic efficiency of the electrodeposition coating composition of the present invention is 30 mg/C or less in the condition where an article to be coated is dipped in the electrodeposition coating composition to perform electrodeposition coating so as to form a cured electrodeposition coating film 15 μm in thickness. The coulombic efficiency means the ratio of the amount (mg) of the precipitated coating material to the charge amount (coulomb) consumed by flowing a current. The electrodeposition coating composition of the present invention contains the zinc compound (A-1) and/or the bismuth compound (A-2), and therefore, the electrical conductivity of the electrodeposition coating composition tends to be higher than that of a conventional one. In the electrodeposition coating composition as described above, the coulombic efficiency is adjusted to be within the above range, thereby ensuring that good throwing power can be secured and good appearance of the obtained coating film can be kept. The coulombic efficiency is more preferably 15 to 25 mg/C.

Examples of the method for controlling the coulombic efficiency within the above range when forming the electrodeposition coating film 15 μm in thickness include a method using the aforementioned specific neutralizing acid, a method using, as the aminated resin (B), a plastically modified alkylene oxide adduct or the like, a method in which the amine value, number average molecular weight, and hydroxyl value of the aminated resin (B) are controlled within the above ranges, a method in which an alkylene oxide adduct and the like are added for the control, and a method using the bismuth compound (A-2) in a water-dispersed colloid form.

The coulombic efficiency is an index showing an ability of precipitating the solid content of the coating material. Specifically, the coulombic efficiency is the amount (mg) of the precipitated coating material per unit charge amount (coulomb) consumed by flowing a current and per unit thickness of the precipitated coating film. In the measurement of this coulombic efficiency, an article to be coated is dipped in the electrodeposition coating composition to perform electrodeposition coating at a constant voltage (150 V and 200 V) so that the thickness of the cured electrodeposition coating film is 15 μm. The obtained electrodeposition coating film is baked to cure, and the mass of the cured electrodeposition coating film is measured. The coulombic efficiency can be obtained from the resulting amount of the cured electrodeposition coating film according to the following formula.

$$\text{Coulombic efficiency (mg/C)} = (\text{Weight after coating} - \text{Weight before coating) (mg)} / \text{Integrated coulomb value (C)}$$

The electrical conductivity of the electrodeposition coating composition of the present invention is preferably 1500 to 3000 μS/cm, more preferably 1600 to 2500 μS/cm. When the electrical conductivity is less than 1500 μS/cm, there is a fear that the throwing power is not sufficiently improved. When the electrical conductivity exceeds 3000 μS/cm, gas pinholes may be generated, and there is therefore a fear of deteriorated appearance of a coating film surface. The electrical conductivity may be measured using a commercially available electrical conductivity meter according to JIS K 0130 (General rules for electrical conductivity measuring method).

The coating film viscosity of the electrodeposition coating film obtained using the electrodeposition coating composition of the present invention is 3000 Pa·s or less at 50° C. When the coating film viscosity of the uncured electrodeposition coating film obtained by precipitation from the electrodeposition coating composition is 3000 Pa·s or less at 50° C., the diameter of a current path when a voltage is applied is increased, so that the generation of coating film defects such as gas pinholes is suppressed, and the appearance of the cured electrodeposition coating film to be obtained is improved. The above coating film viscosity is more preferably 1000 to 2500 Pa·s, and even more preferably 1200 to 2000 Pa·s.

In the present invention, the reason why the viscosity of the electrodeposition coating film is measured at 50° C. is as follows. The electrodeposition coating film is a coating film precipitated by application of a voltage. The electrodeposition coating film precipitated on the surface of an article to be coated is decreased in viscosity, allowing the coating film surface to be smooth because heat flow is caused by heating. A block agent of the blocked isocyanate curing agent contained in the electrodeposition coating film is thermally dissociated and undergoes crosslinking reaction with, for example, hydroxyl groups and amino groups contained in the cationic epoxy resin, allowing a sharp rise in the viscosity of the coating film. The electrodeposition coating film is cured by this process to give a cured electrodeposition coating film. In other words, the electrodeposition coating film is once reduced in viscosity by heating, and then the viscosity is resultantly increased.

Moreover, Joule heat is generated in the electrodeposition coating operation, and the precipitated film temperature at a place close to an article to be coated is raised to about 40 to 50° C., which is higher than the bath temperature of the electrodeposition coating composition. In other words, the measurement of viscosity at 50° C. is made to reproduce the physical properties (represented by flow characteristics) of the electrodeposition coating film itself highly accurately. As mentioned above, the temperature of 50° C. is preferable for measuring the coating film viscosity from the viewpoint of the above properties of the electrodeposition coating composition, and is considered to be a temperature at which even crosslinking of the coating film-forming resin does not occur, that is, a temperature appropriate to determine the properties of the uncured electrodeposition coating film when the coating film is precipitated.

In the electrodeposition coating composition of the present invention, examples of the method for controlling the coating film viscosity of the uncured electrodeposition coating film obtained by the precipitation from the electrodeposition coating composition to 3000 Pa·s or less at 50° C. include a method using the aforementioned specific neutralizing acid, a method using an aminated resin (B) having a specific structure, a method in which the number average molecular weight and hydroxyl value of the aminated resin (B) are controlled within the above ranges, a method using the bismuth compound (A-2) in a water-dispersed colloid form, a method in which the amount of a solvent contained in the electrodeposition coating composition is controlled, and a method in which the mixing ratio of the aminated resin (B) to the curing agent (C) is controlled.

In this case, the coating film viscosity of the electrodeposition coating film can be measured in the following manner. Electrodeposition coating is applied to an article to be coated so that the coating film thickness is 15 μm for 180 seconds to form an electrodeposition coating film, which is then washed with water to remove the excess electrodeposition coating composition adhered to the article to be coated. Immediately after that, the coating film is peeled from the article to be coated without being dried to give a sample of an uncured coating film. The sample thus obtained may be subjected measurement of the coating film viscosity at 50° C. by using a dynamic viscoelasticity measuring device. As the dynamic viscoelasticity measuring device, for example, a rotating type dynamic viscoelasticity measuring device "Rheosol G-3000" (manufactured by UBM Co., Ltd.) may be used.

Electrodeposition Coating and Formation of Electrodeposition Coating Film

In the electrodeposition coating using an electrodeposition coating composition, an article to be coated is used as the cathode, and a voltage of 50 to 450 V is generally applied across the cathode and the anode. An electrodeposition coating film is thereby precipitated onto the article to be coated. The bath temperature of the coating composition during electrodeposition coating is generally controlled to 10 to 45° C.

The electrodeposition coating method of the present invention includes a process of dipping an article to be coated in the electrodeposition coating composition and a process of applying a voltage across the cathode, for which the article to be coated is used, and the anode to thereby precipitate a coating film. The time for voltage application can be designed to be 2 to 5 minutes though it differs depending on the condition of electrodeposition.

The thickness of the electrodeposition coating film after heat curing is preferably 5 to 40 μm, more preferably 10 to 25 μm. When the film thickness is less than 5 μm, there is a fear of insufficient corrosion resistance. On the other hand, when the film thickness exceeds 40 μm, this may lead to waste of a coating material.

After completion of the electrodeposition process, the electrodeposition coating film obtained in the aforementioned manner is heated at 120 to 260° C., preferably 140 to 220° C. for 10 to 30 minutes as it is or after being washed with water, whereby a heat-cured electrodeposition coating film is formed.

The use of the electrodeposition coating composition of the present invention has an advantage that excellent corrosion resistance is obtained even in the case where electrodeposition coating is applied to an article to be coated having been subjected to zirconium chemical conversion treatment. A chemical conversion treatment film formed with a zirconium chemical conversion treatment agent is outstandingly thinner than a chemical conversion treatment film formed with a zinc phosphate chemical conversion treatment agent. Moreover, there is a case where the formed chemical conversion treatment film has uneven thickness on the article to be coated having been subjected to zirconium chemical conversion treatment. When such uneven thickness is present, the surface resistance of the article to be coated is uneven. In the electrodeposition coating in which a resin component and the like precipitate by voltage application, there is a problem that the throwing power is deteriorated, and the appearance defects such as gas pinholes are generated in the coating film because of uneven surface resistance of the article to be coated. Meanwhile, the use of the electrodeposition coating composition of the present invention has an advantage that excellent throwing power is exhibited, and a cured electrodeposition coating film having a good appearance is obtained.

The zirconium chemical conversion treatment agent has an advantage that it has a low environmental load since it contains substantially no phosphate ion. The zirconium chemical conversion treatment agent also has an advantage that the amount of sludge to be generated can be reduced. The chemical conversion treatment using a zirconium chemical conversion treatment agent also has an advantage that chemical treatment can be applied to an article to be coated in reduced number of steps since it requires no surface control process.

EXAMPLES

The present invention will be explained in more detail by way of examples, which are not intended to limit the present invention. In the following examples, all designations of "part(s)" and "%" are on the mass basis, unless otherwise noted.

Production Example 1-1

Production of Aminated Resin (1)

In a reaction container, 58 parts of methyl isobutyl ketone, 940 parts of a bisphenol A-type epoxy resin (trade name: DER-331J, manufactured by The Dow Chemical Company), 388 parts of bisphenol A, 65 parts of octylic acid, and 2 parts of dimethylbenzylamine were added, and the temperature in the reaction container was then kept at 140° C. to react the components until the epoxy equivalent of the reaction mixture reached 1300 g/eq. Then, the mixture was cooled until the temperature in the reaction container reached 120° C. Then, a mixture of 75 parts of diethylenetriamine diketimine (a methyl isobutyl ketone solution having a solid content of 73%), 54 parts of diethanolamine, and 23 parts of N-methylethanolamine was added to the reaction mixture, and the resulting mixture was then reacted at 120° C. for 1 hour to give an aminated resin (1) (cation-modified epoxy resin). This resin had a number average molecular weight of 2,900 and an amine value of 53 mg KOH/g.

The number average molecular weight was measured according to the method defined in JIS K 0124-83 and calculated from the chromatogram measured with a gel permeation chromatograph based on the molecular weight of standard polystyrene. As the gel permeation chromatograph, "HLC8120GPC" (manufactured by TOSOH CORPORATION) was used. As the column, four columns: "TSKgel G-4000HXL," "TSKgel G-3000HXL," "TSKgel G-2500HXL," and "TSKgel G-2000HXL" (trade names, all of these products are manufactured by TOSOH CORPORATION) were used. The measurement was performed using tetrahydrofuran as the mobile phase under the conditions of a measuring temperature of 40° C. and a flow rate of 1 ml/min using a detector RI.

Production Example 1-2

Production of Aminated Resin (2)

In a reaction container, 58 parts of methyl isobutyl ketone, 940 parts of a bisphenol A-type epoxy resin (trade name: DER-331J, manufactured by The Dow Chemical Company), 380 parts of bisphenol A, 76 parts of octylic acid, and 2 parts of dimethylbenzylamine were added, and the temperature in the reaction container was then kept at 140° C. to react the components until the epoxy equivalent of the reaction mixture reached 1300 g/eq. Then, the mixture was cooled until the temperature in the reaction container reached 120° C. Then, a mixture of 75 parts of diethylenetriamine diketimine (a methyl isobutyl ketone solution having a solid content of 73%), 54 parts of diethanolamine, and 23 parts of N-methylethanolamine was added to the reaction mixture, and the resulting mixture was then reacted at 120° C. for 1 hour to give an aminated resin (2) (cation-modified epoxy resin). This resin had a number average molecular weight of 2,750 and an amine value of 53 mg KOH/g.

Production Example 1-3

Production of Aminated Resin (3)

In a reaction container, 58 parts of methyl isobutyl ketone, 940 parts of a bisphenol A-type epoxy resin (trade name: DER-331J, manufactured by The Dow Chemical Company), 371 parts of bisphenol A, 86 parts of octylic acid, and 2 parts of dimethylbenzylamine were added, and the temperature in the reaction container was then kept at 140° C. to react the components until the epoxy equivalent of the reaction mixture reached 1300 g/eq. Then, the mixture was cooled until the temperature in the reaction container reached 120° C. Then, a mixture of 75 parts of diethylenetriamine diketimine (a methyl isobutyl ketone solution having a solid content of 73%), 55 parts of diethanolamine, and 23 parts of N-methylethanolamine was added to the reaction mixture, and the resulting mixture was then reacted at 120° C. for 1 hour to give an aminated resin (3) (cation-modified epoxy resin). This resin had a number average molecular weight of 2,560 and an amine value of 53 mg KOH/g.

Production Example 1-4

Production of Aminated Resin (4)

In a reaction container, 58 parts of methyl isobutyl ketone, 940 parts of a bisphenol A-type epoxy resin (trade name: DER-331J, manufactured by The Dow Chemical Company), 388 parts of bisphenol A, 114 parts of octylic acid, and 2 parts of dimethylbenzylamine were added, and the temperature in the reaction container was then kept at 140° C. to react the components until the epoxy equivalent of the reaction mixture reached 1920 g/eq. Then, the mixture was cooled until the temperature in the reaction container reached 120° C. Then, a mixture of 78 parts of diethylenetriamine diketimine (a methyl isobutyl ketone solution having a solid content of 73%), 38 parts of diethanolamine, and 11 parts of N-methylethanolamine was added to the reaction mixture, and the resulting mixture was then reacted at 120° C. for 1 hour to give an aminated resin (4) (cation-modified epoxy resin). This resin had a number average molecular weight of 2,920 and an amine value of 42 mg KOH/g.

Production Example 1-5

Production of Aminated Resin (5)

In a reaction container, 76 parts of methyl isobutyl ketone, 940 parts of a bisphenol A-type epoxy resin (trade name: DER-331J, manufactured by The Dow Chemical Company), 209 parts of bisphenol A, 339 parts of a bisphenol A ethylene oxide adduct (trade name: NEWPOL BPE-60, manufactured by Sanyo Chemical Industries, Ltd.), 96 parts of octylic acid, and 2 parts of dimethylbenzylamine were added, and the temperature in the reaction container was then kept at 180° C. for 1 hour. Then, 3 parts of dimethylbenzylamine was further added to the mixture, and the temperature in the reaction container was kept at 130° C. to react the components until the epoxy equivalent of the reaction mixture reached 1300 g/eq. Then, the mixture was cooled until the temperature in the reaction container reached 120° C. Then, a mixture of 85 parts of diethylenetriamine diketimine (a methyl isobutyl ketone solution having a solid content of 73%), 62 parts of diethanolamine, and 27 parts of N-methylethanolamine was added to the reaction mixture, and the resulting mixture was then reacted at 120° C. for 1 hour to give an aminated resin (5) (cation-modified epoxy resin). This resin had a number average molecular weight of 2,900 and an amine value of 53 mg KOH/g.

Production Example 2-1

Production of Blocked Isocyanate Curing Agent (1)

A reaction container was charged with 1680 parts of hexamethylene diisocyanate (HDI) and 732 parts of MIBK, and the mixture was heated to 60° C. A solution obtained by dissolving 346 parts of trimethylolpropane in 1067 parts of MEK oxime was added dropwise to the mixture at 60° C. over 2 hours. Further, the mixture was heated at 75° C. for 4 hours, and then it was confirmed that the absorption attributable to an isocyanate group disappeared in the measurement of IR spectrum. After the mixture was allowed to cool, 27 parts of MIBK was added to give a blocked isocyanate curing agent (1) having a solid content of 78%.

Production Example 2-2

Production of Blocked Isocyanate Curing Agent (2)

A reaction container was charged with 1340 parts of 4,4'-diphenylmethane diisocyanate and 277 parts of MIBK, and the mixture was heated to 80° C. Then, a solution obtained by dissolving 226 parts of ε-caprolactam in 944 parts of butyl cellosolve was added dropwise to the mixture at 80° C. over 2 hours. Further, the mixture was heated at 100° C. for 4 hours, and then it was confirmed that the absorption attributable to an isocyanate group disappeared in the measurement of IR spectrum. After the mixture was allowed to cool, 349 parts of MIBK was added to give a blocked isocyanate curing agent (2) (solid content 80%).

Production Example 3 Production of Pigment Dispersion Resin

A reaction container equipped with a stirrer, a cooling tube, a nitrogen introduction tube, and a temperature gage was charged with 385 parts of a bisphenol A-type epoxy resin, 120 parts of bisphenol A, 95 parts of octylic acid, and 1 part of a 1% 2-ethyl-4-methylimidazole solution, and the mixture was reacted at 160 to 170° C. under a nitrogen atmosphere for 1 hour. Then, the mixture was cooled to 120° C., and then 198 parts of a methyl isobutyl ketone solution (solid content 95%) of 2-ethylhexanol-based half-blocked tolylenediisocyanate was added to the mixture. The reaction mixture was kept at 120 to 130° C. for 1 hour, and then ethylene glycol mono-n-butyl ether 157 was added to the mixture, which was then cooled to 85 to 95° C. to homogenize. Then, 277 parts of diethylenetriamine diketimine (a methyl isobutyl ketone solution having a solid content of 73%) was added to the mixture, and the mixture was then stirred at 120° C. for 1 hour, and then 13 parts of ethylene glycol mono-n-butyl ether was added to the mixture to produce an aminated resin. Then, 18 parts of ion exchange water and 8 parts of formic acid were charged and mixed in the aminated resin, and the mixture was then stirred for 15 minutes. Then, 200 parts of ion exchange water was mixed in the mixture to give a resin solution (resin solid content 25%) of a pigment dispersion resin (average molecular weight 2,200).

Production Example 4-1

Production of Electrodeposition Coating Resin Emulsion (Em1)

First, 350 parts (solid content) of the aminated resin (1) obtained in Production Example 1-1, 75 parts (solid content) of the blocked isocyanate curing agent (1) obtained in Production Example 2-1, and 75 parts (solid content) of the blocked isocyanate curing agent (2) obtained in Production Example 2-2 were mixed, and ethylene glycol mono-2-ethylhexyl ether was added in an amount of 3% (15 parts) based on the solid content of the mixture. Next, formic acid was added so that the MEQ (A) became 24 to neutralize the mixture, and the mixture was then gradually diluted by addition of ion exchange water. Then, methyl isobutyl ketone was removed under reduced pressure so that the solid content of the mixture became 40% to give a resin emulsion (Em1).

Production Example 4-2

Production of Electrodeposition Coating Sesin Emulsion (Em2)

A production process was performed in the same manner as in Production Example 4-1 except that the aminated resin (2) was used in place of the aminated resin (1) to give a resin emulsion (Em2).

Production Example 4-3

Production of Electrodeposition Coating Resin Emulsion (Em3)

A production process was performed in the same manner as in Production Example 4-1 except that the aminated resin (3) was used in place of the aminated resin (1), and methanesulfonic acid (MSA) was used in place of formic acid and added so that the MEQ (A) became 24 for neutralization, thereby obtaining a resin emulsion (Em3).

Production Example 4-4

Production of Electrodeposition Coating Resin Emulsion (Em4)

A production process was performed in the same manner as in Production Example 4-1 except that the aminated resin (3) was used in place of the aminated resin (1), and dimethylolpropionic acid (DMPA) was used in place of formic acid and added so that the MEQ (A) became 24 for neutralization, thereby obtaining a resin emulsion (Em4).

Production Example 4-5

Production of Electrodeposition Coating Resin Emulsion (Em5)

A production process was performed in the same manner as in Production Example 4-1 except that the aminated resin (4) was used in place of the aminated resin (1), and dimethylolpropionic acid (DMPA) was used in place of formic acid and added so that the MEQ (A) became 24 for neutralization, thereby obtaining a resin emulsion (Em5).

Production Example 4-6

Production of Electrodeposition Coating Resin Emulsion (Em6)

A production process was performed in the same manner as in Production Example 4-1 except that the aminated resin (5) was used in place of the aminated resin (1), and dimethylolpropionic acid (DMPA) was used in place of formic acid and added so that the MEQ (A) became 24 for neutralization, thereby obtaining a resin emulsion (Em6).

Production Example 5-1

Production of Electrodeposition Coating Pigment Dispersion Paste (1)

A mixture obtained based on the composition shown in Table 1 below and containing the pigment dispersion resin obtained in Production Example 3 was dispersed at 40° C. using a sand mill until the volume average particle diameter D50 became 0.6 μm to give a pigment dispersion paste (1) (solid content 49%). In the measurement of the volume average particle diameter D50, a laser Doppler system particle size analyzer (Microtrack UPA 150, manufactured by Nikkiso Co., Ltd.) was used, and the dispersion was diluted with ion exchange water so as to obtain a proper signal level to measure the volume average particle diameter D50.

TABLE 1

| | |
|---|---|
| Pigment dispersion resin of Production Example 3 | 50 |
| Titanium dioxide | 50 |
| Carbon black | 1 |
| Dioctyltin oxide | 2 |
| Clay | 7 |
| Ion exchange water | 39 |

Production Example 5-2

Production of Electrodeposition Coating Pigment Dispersion Paste (2)

An electrodeposition coating pigment dispersion paste (2) was produced in the same manner as in Production Example 5-2 except that dioctyltin oxide was not used.

Production Example 6-1

Production of Zinc Methanesulfonate

In a stainless container, 119 parts of ion exchange water, 32.6 parts of zinc oxide (reagent), and 110 parts of 70% methanesulfonic acid (manufactured by BASF SE) were added, and the mixture was stirred at 60° C. for 1 hour to produce zinc methanesulfonate having a zinc concentration of 10%.

Production Example 6-2

Production of Zinc Acetate

In a stainless container, 176 parts of ion exchange water, 32.6 parts of zinc oxide (reagent), and 53 parts of 90% acetic acid (reagent) were added, and the mixture was stirred at 60° C. for 1 hour to produce zinc acetate having a zinc concentration of 10%.

Production Example 6-3

Production of Bismuth Lactate

In a stainless container, 241 parts of ion exchange water, 11.7 parts of bismuth oxide (reagent), and 9.0 parts of 50% lactic acid (reagent) were added, and the mixture was stirred at 60° C. for 1 hour to produce bismuth lactate having a bismuth concentration of 4% in the form of water-dispersed colloid.

Production Example 6-4

Production of Glycine-Containing Bismuth Lactate

In a stainless container, 241 parts of ion exchange water, 11.7 parts of bismuth oxide (reagent), 9.0 parts of 50% lactic acid (reagent), and 3.8 parts of glycine (reagent) were added, and the mixture was stirred at 60° C. for 1 hour to produce glycine-containing bismuth lactate having a bismuth concentration of 4% in the form of water-dispersed colloid.

Production Example 6-5

Production of Bismuth Dimethylolpropionate

In a stainless container, 241 parts of ion exchange water, 11.7 parts of bismuth oxide (reagent), and 6.7 parts of dimethylolpropionic acid (DMPA, reagent) were added, and the mixture was stirred at 60° C. for 1 hour to produce bismuth dimethylolpropionate having a bismuth concentration of 4% in the form of water-dispersed colloid.

Example 1

A stainless container was charged with 2065 parts of ion exchange water and, as the zinc compound (A1), 8 parts of zinc acetate having a zinc concentration of 10% that was produced in Production Example 6-2. Next, 1600 parts of the electrodeposition coating resin emulsion (EmA) of Production Example 4-2 and 327 parts of a pigment (the pigment dispersion paste 1 of Production Example 5-1) were added to the mixture, and the resulting mixture was then aged at 40° C. for 16 hours to produce an electrodeposition coating composition.

A cold rolled steel sheet (JIS G3141, SPCC-SD) was dipped in Surfcleaner EC90 (manufactured by Nippon Paint Co., Ltd.) at 40° C. for 2 minutes to perform degreasing treatment. Next, this steel sheet was dipped in Surfdine EC 3200 (manufactured by Nippon Paint Co., Ltd.) at 40° C. for 90 seconds. After the steel sheet was washed with deionized water, 2-ethylhexyl glycol was added to the obtained electrodeposition coating composition in a required amount so that the thickness of a cured electrodeposition coating film became 15 μm. Then, the steel sheet was entirely sunk in the electrodeposition coating composition mixture, and then application of a voltage was started immediately. The voltage was applied in the conditions that the voltage was raised up to 180 V over 30 seconds and then kept at this voltage for 150 seconds to precipitate an uncured electrodeposition coating film on the article to be coated (cold rolled steel sheet). The uncured electrodeposition coating film obtained in this manner was cured by heating at 160° C. for 15 minutes to give an electrodeposition coating plate having a cured electrodeposition coating film.

Then, the milligram equivalent (MEQ (A)) of an acid, coulombic efficiency, electrical conductivity, coating film resistance, and coating film viscosity were measured as the properties of the obtained electrodeposition coating composition. The method of measurement is explained below. The results of measurement are shown in the following tables.

Milligram Equivalent (MEQ (A)) of Acid Per 100 g of Resin Solid Content of Electrodeposition Coating Composition About 10 g of the electrodeposition coating composition was precisely weighed and dissolved in about 50 ml of a solvent (THF: tetrahydrofuran), and potentiometric titration was performed using a 1/10 N NaOH solution to thereby quantitatively measure the amount of acids contained in the electrodeposition coating composition.

Coulombic Efficiency (15 µm) of Electrodeposition Coating Composition and Coating Film Resistance The mass of the cold rolled steel sheet after being subjected to zirconium chemical conversion treatment was measured. Then, the steel sheet was dipped in the electrodeposition coating composition to apply electrodeposition coating to the steel sheet at a constant coating voltage (150 V and 200 V) so that the thickness of the cured electrodeposition coating film was 15 µm. After the electrodeposition coating, the coulomb value and residual current value were measured. The mass of the cured electrodeposition coating film obtained by baking the obtained electrodeposition coating film to cure was measured.

These measured values were used to find coulombic efficiency (15 µm) and coating film resistance according to the following formulae.

Coulombic efficiency (mg/C)=Coating film mass (mg)/Integrated coulomb value(C)

Coating film resistance (kΩ·cm$^2$)=Coating area (cm$^2$)×Voltage (V)/Residual current (mA)

Measurement of Electrical Conductivity of Electrodeposition Coating Composition

The electrical conductivity of the electrodeposition coating composition was measured at a liquid temperature of 25° C. by using CM-30S (electrical conductivity meter) manufactured by DKK-TOA CORPORATION) according to JIS K0130

(General Rules for Electrical Conductivity Measuring Method).

Measurement of Coating Film Viscosity of Electrodeposition Coating Film at 50° C.

Using the electrodeposition coating composition, an electrodeposition coating film was formed on an article to be coated so that the film thickness was 15 µm. The electrodeposition coating film was washed with water to remove excess electrodeposition coating composition. Then, after water was removed, the coating film was taken out immediately without being dried to give a sample. The sample obtained in this manner was set to a rotating type dynamic viscoelasticity measuring device "Rheosol G-3000" (manufactured by UBM Co., Ltd.). The conditions of measurement were as follows: strain 0.5 deg, frequency 0.02 Hz, and temperature 50° C. After the start of measurement, the viscosity of the coating film was measured when the electrodeposition coating film was uniformly spread in a cone-plate.

Examples 2 to 10 and Comparative Examples 1 to 4

An electrodeposition coating composition was prepared in the same manner as in Example 1 except that the composition was changed to that shown in the following tables. The obtained electrodeposition coating composition was used for electrodeposition coating in the same manner as in Example 1 to give an electrodeposition coating plate.

In the composition of the electrodeposition coating composition shown in the following tables, the amounts of the zinc compound (A-1) and the bismuth compound (A-2) blended are each a relative ratio (mass of compounds) to 100 parts by mass of the electrodeposition coating composition, and the amounts of the resin emulsion and pigment blended are each a solid content concentration of each component based on 100 parts by mass of the electrodeposition coating composition.

The following evaluations of the above examples and comparative examples were made. The results of the evaluation are shown in the following tables.

Appearance of Cured Electrodeposition Coating Film (Horizontal View of Coating)

A cold rolled steel sheet after being subjected to zirconium chemical conversion treatment was placed in such a manner that the surface of the steel sheet was arranged in a horizontal direction with respect to the liquid level of the electrodeposition coating composition and dipped in the electrodeposition coating composition. A voltage was applied in such a manner that the voltage was raised over 30 seconds until it reached 180 V and then kept for 150 seconds while the electrodeposition coating composition was stirred at 300 rpm to precipitate an uncured electrodeposition coating film on the steel sheet. The uncured electrodeposition coating film obtained in this manner was cured by heating at 160° C. for 15 minutes to give an electrodeposition coating plate having a cured electrodeposition coating film. The surface roughness of the obtained cured electrodeposition coating film was found by measuring the arithmetic average roughness (Ra) of a roughness curve according to JIS-B0601 by using an Evaluation type Surface Roughness Measurement Instrument (SURFTEST SJ-201P, manufactured by Mitutoyo Co., Ltd.). A sample with 2.5-mm-width cut-off (number of partitions: 5) was subjected to measurement seven times to give Ra values in terms of top/bottom-trimmed mean. It may be said that a smaller Ra value leads to less surface irregularities and a better coating film appearance.

Evaluation of Drying Mark

A cold rolled steel sheet after being subjected to zirconium chemical conversion treatment was dipped in the electrodeposition coating composition, and a voltage was applied in such a manner that the voltage was raised over 30 seconds up to 180 V, and then kept at this voltage for 150 seconds to precipitate an uncured electrodeposition coating film on the steel sheet. The steel sheet provided with the uncured electrodeposition coating film was allowed to stand at room temperature for 5 minutes, washed with water, and then cured by heating at 160° C. for 15 minutes to give an electrodeposition coating plate having a cured electrodeposition coating film. The coating film appearance of the obtained electrodeposition coating plate was visually evaluated according to the following standard.

A: Almost no drying mark is observed.
B: Little drying mark is observed.
C: Drying mark is observed.
D: Clear drying mark is observed.

Evaluation of Uneven Polishing

One surface of a cold rolled steel sheet was polished ten times with a polishing cloth (Polinet Roll 600, manufactured by KOYO-SHA Co., Ltd.). The polished cold rolled steel sheet was subjected to zirconium chemical conversion treatment, and was then dipped in the electrodeposition coating composition to give an electrodeposition coating plate having a cured electrodeposition coating film in the same manner as above. The coating film appearance of the obtained electrodeposition coating plate was visually observed based on the following standard.

AA: Uneven polishing is not observed.
A: Almost no uneven polishing is observed.
B: Slight uneven polishing is observed.
C: Little uneven polishing is observed.
D: Uneven polishing is observed.
E: Clear uneven polishing is observed.

Evaluation of Throwing Power

Figure 1:
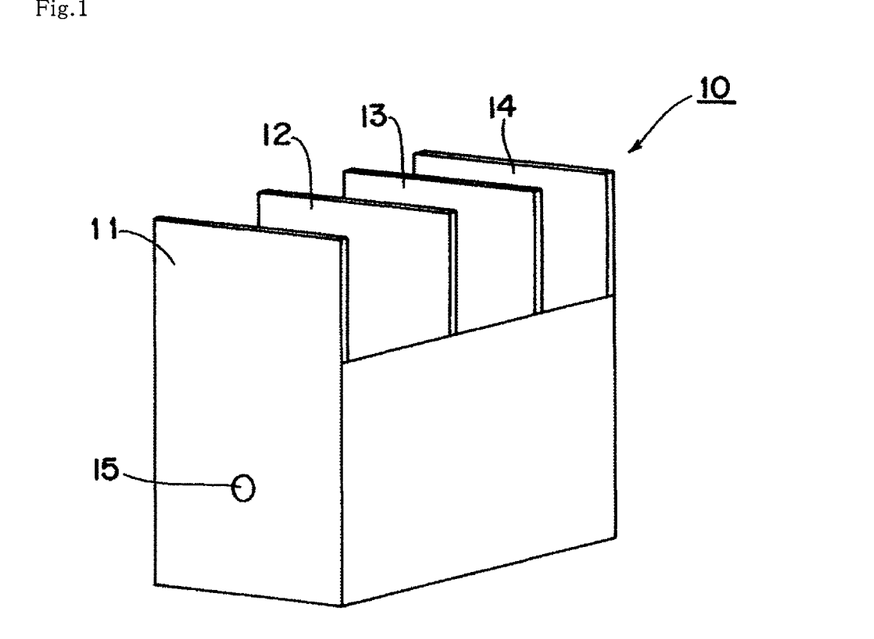
FIG. 1 is a perspective view showing an example of a box used in the evaluation of throwing power.

The throwing power was evaluated by the so-called four-sheet box method. Specifically, as shown in FIG. 1, four cold rolled steel sheets (JIS G3141 SPCC-SD) 11 to 14 which were treated with a zirconium chemical conversion treatment agent used in each example or comparative example were disposed parallel to each other at intervals of 20 mm in a standing state, and the bottom part of both side surfaces and the bottom surface were sealed with an insulator such as a cloth adhesive tape to prepare a box 10. In this case, the steel sheets 11 to 13 except for the steel sheet 14 were each provided with an 8-mm-φ through hole 15 at their lower part.

Figure 2:
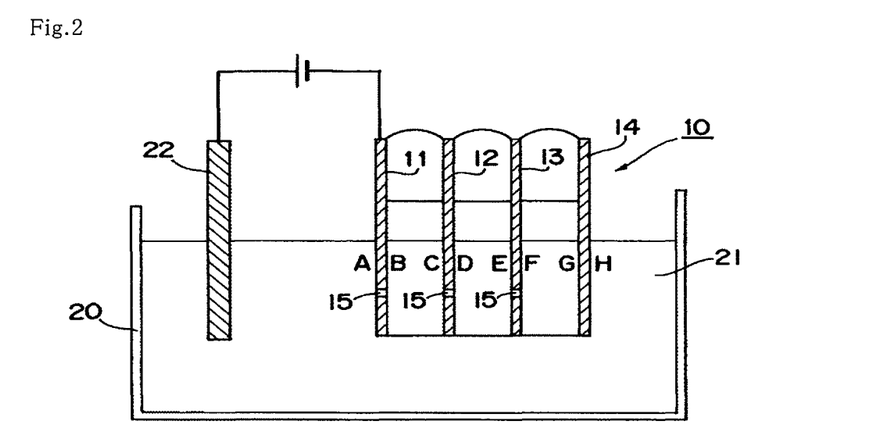
FIG. 2 is a schematic sectional view showing a method of evaluation of throwing power.

To a vinyl chloride container, 4 L of the electrodeposition coating composition prepared in each example or comparative example was transferred to form a first electrodeposition vessel. As shown in FIG. 2, the box 10 used as an article to be coated was dipped in an electrodeposition coating container 20 containing an electrodeposition coating material 21. In this case, the coating material 21 entered the inside of the box 10 only from each through hole 15.

The coating material 21 was stirred with a magnetic stirrer (not shown). Then, the steel sheets 11 to 14 were electrically connected with each other, and a counter electrode 22 was disposed at a distance of 150 mm from the nearest steel sheet 11. Each of the steel sheets 11 to 14 was used as the cathode and the counter electrode 22 was used as the anode and a voltage was applied thereto, thereby applying an electrodeposition coating to the cold rolled steel sheet having been subjected to zirconium chemical conversion treatment. The coating treatment was performed by raising the voltage over 30 seconds from the start of voltage application up to the voltage at which the thickness of the coating film to be formed on the A-surface of the steel sheet 11 reached 15 μm, and then keeping the voltage for 150 seconds in usual electrodeposition.

Each steel sheet after coating was washed with water and baked at 170° C. for 25 minutes, followed by air cooling. Then, the thickness of the coating film formed on the A-surface of the steel sheet 11 nearest the counter electrode 22 and the thickness of the coating film formed on the G-surface of the steel sheet 14 most distant from the counter electrode 22 were measured, and the throwing power was evaluated by the ratio (G/A value) of the film thickness (G-surface)/film thickness (A-surface).

When the value exceeds 50%, the coating film is determined to have ultrahigh throwing power, and is particularly excellent in throwing power. On the other hand, when the value is less than 50%, the coating film is determined to have low throwing power.

Evaluation of Generation of Gas Pinholes

A voltage was applied to an alloyed molten zinc plated steel sheet after being subjected to zirconium chemical conversion treatment in the condition that the voltage was raised over 30 seconds up to 160 V, and then kept at this voltage for 150 seconds to precipitate an uncured electrodeposition coating film on the steel sheet. The obtained electrodeposition coating film was washed with water, and then baked at 160° C. for 10 minutes. The obtained cured electrodeposition coating film was visually observed to determine whether or not gas pinholes were generated. The same coating operation was performed at intervals of 10 V until the voltage was raised up to 260 V to determine whether or not gas pinholes were generated. The higher the voltage at which gas pinholes are generated is, the more scarcely the gas pinholes are generated, and therefore, the electrodeposition coating film is evaluated as having good performance.

Evaluation of Low-Temperature Baking Corrosion Resistance

A cold rolled steel sheet after being subjected to zirconium chemical conversion treatment was dipped in the electrodeposition coating composition, and a voltage was applied in such a manner that the voltage was raised over 30 seconds up to 180 V, and then kept at this voltage for 150 seconds to precipitate an uncured electrodeposition coating film on the steel sheet. The steel sheet provided with the uncured electrodeposition coating film was allowed to stand at room temperature for 5 minutes, washed with water, and then cured by heating at 160° C. for 15 minutes to give an electrodeposition coating plate having a cured electrodeposition coating film.

A cut reaching the substrate was made using a knife in the cured electrodeposition coating film of the electrodeposition coating plate. This coating plate was dipped in a 5% saline solution at 50° C. for 480 hours, and then this coating plate was observed as to whether or not rust or a swell generated from the linear cut part and evaluated. The standard of evaluation is as follows.

Standard of Evaluation

A: The maximum width of rust or a swell is less than 2.5 mm from the cut part (both sides).
B: The maximum width of rust or a swell is 2.5 mm or more and less than 5 mm from the cut part (both sides).
C: The maximum width of rust or a swell is 5 mm or more and less than 10 mm from the cut part (both sides).
D: The maximum width of rust or a swell is 10 mm or more and less than 15 mm from the cut part (both sides).
E: The maximum width of rust or a swell is 15 mm or more from the cut part (both sides).

Evaluation of Edge Rust Preventability

The evaluation of this test was made not by coating of the cold rolled steel sheet but by coating of an L-type exclusive replaceable razor blade (LB10K, manufactured by Olfa Corporation). The L-type exclusive replaceable razor blade was dipped in Surfcleaner EC90 (manufactured by Nippon Paint Co., Ltd.) at 40° C. for 2 minutes to perform degreasing treatment. Next, this razor blade was dipped in Surfdine EC 3200 (manufactured by Nippon Paint Co., Ltd.) at 40° C. for 90 seconds. After the steel sheet was washed with deionized water, the razor blade was dipped in the electrodeposition coating composition to perform electrodeposition coating treatment in the same condition as in the above electrodeposition coating to form a cured electrodeposition coating film. Then, a salt spray test (35° C.×168 hours) was performed, and the number of rusted portions generated at the edge of the L-type exclusive replaceable razor blade was counted and evaluated according to the following standard.

Standard of Evaluation

A: The number of rusted portions is 10 or less.
B: The number of rusted portions is 11 to 50.
C: The number of rusted portions is 51 to 100.
D: The number of rusted portions is 101 or more.

TABLE 2

| | | | Example 1 | Example 2 | Example 3 | Example 4 | Example 5 | Example 6 | Example 7 | Example 9 | Example 10 |
|---|---|---|---|---|---|---|---|---|---|---|---|
| Coating pretreatment of article to be coated | | | Zr treatment | Zr treatment | Zr treatment | Zr treatment | Zr treatment | Zr treatment | Zr treatment | Zr treatment | Zr treatment |
| Electrodeposition coating composition | Zinc compound (A-1), bismuth compound (A-2) (%) | Zn methanesulfonate | | | 0.1 | 0.1 | | | | 0.1 | 0.1 |
| | | Zn acetate | 0.02 | | | | | | | 0.15 | |
| | | Bismuth lactate | | | | | 0.1 | | | | |
| | | Glycine bismuth lactate | | | | | | 0.1 | | | |
| | | Bismuth DMPA | | | | | | | 0.1 | | |
| | Resin emulsion (%) | Em1 | | | | | | | | | |
| | | Em2 | 16% | | | | | | | | |
| | | Em3 | | 16% | | | | | | | |
| | | Em4 | | | 16% | 16% | 16% | 16% | | | |
| | | Em5 | | | | | | | 16% | 16% | |
| | | Em6 | | | | | | | | | 16% |
| | Pigment (%) | Including Sn (Production Example 5-1) | 4% | 4% | 4% | | | | 4% | 4% | 4% |
| | | Excluding Sn (Production Example 5-2) | | | | 4% | 4% | 4% | | | |
| Characteristics | MEQA of electrodeposition coating composition | | 27 | 35 | 35 | 35 | 35 | 35 | 32 | 37 | 35 |
| | Coulombic efficiency (mg/C) | | 23 | 18 | 18 | 23 | 21 | 22 | 18 | 18 | 18 |
| | Electrical conductivity (μS/cm) | | 1830 | 2500 | 2200 | 1800 | 1600 | 1700 | 2000 | 2400 | 2200 |
| | 15-μm coating film resistance (kΩ · cm$^2$) | | 1200 | 1000 | 900 | 1200 | 600 | 1200 | 1000 | 1000 | 500 |
| | Coating film viscosity at 50° C. (Pa · s) | | 2000 | 2000 | 2000 | 2000 | 1500 | 2000 | 2000 | 2000 | 1500 |
| Evaluation of performance | Horizontal Ra | | 0.29 | 0.28 | 0.28 | 0.28 | 0.28 | 0.28 | 0.23 | 0.23 | 0.22 |
| | Uneven polishing | | B | A | A | A | A | A | A | A | AA |
| | Drying mark | | B | A | A | A | A | A | A | A | A |
| | Throwing power (%) | | 60 | 65 | 60 | 60 | 50 | 60 | 60 | 60 | 60 |
| | Gas pinhole generation voltage (V) | | 220 | 210 | 230 | 220 | 240 | 220 | 230 | 230 | 250 |
| | Low-temperature baking corrosion resistance | | B | A | A | A | B | A | A | B | A |
| | Edge rust preventability | | B | A | A | B | B | B | B | A | B |

TABLE 3

| | | | Comparative Example 1 | Comparative Example 2 | Comparative Example 3 | Comparative Example 4 |
|---|---|---|---|---|---|---|
| Coating pretreatment of article to be coated | | | Zr treatment | Zr treatment | Zr treatment | Zr treatment |
| Electrodeposition coating composition | Zinc compound (A-1), bismuth compound (A-2) (%) | Zn methanesulfonate | | | | |
| | | Zn acetate | | 0.02 | | |
| | | Bismuth lactate | | | 0.1 | |
| | | Glycine bismuth lactate | | | | |
| | | Bismuth DMPA | | | | 0.1 |
| | Resin emulsion (%) | Em1 | 16% | 16% | 16% | 16% |
| | | Em2 | | | | |
| | | Em3 | | | | |
| | | Em4 | | | | |
| | | Em5 | | | | |
| | | Em6 | | | | |
| | Pigment (%) | Including Sn (Production Example 5-1) | 4% | 4% | 4% | |
| | | Excluding Sn (Production Example 5-2) | | | | 4% |
| Characteristics | MEQA of electrodeposition coating composition | | 23 | 25 | 35 | 32 |
| | Coulombic efficiency (mg/C) | | 26 | 23 | 19 | 23 |
| | Electrical conductivity (μS/cm$^2$) | | 1640 | 1830 | 2500 | 1450 |
| | 15-μm coating film resistance (kΩ · cm$^2$) | | 600 | 740 | 1200 | 700 |
| | Coating film viscosity at 50° C. (Pa · s) | | 5000 | 7000 | 12000 | 6000 |
| Evaluation of performance | Horizontal Ra | | 0.3 | 0.32 | 0.48 | 0.35 |
| | Uneven polishing | | D | C | D | C |
| | Drying mark | | C | C | C | B |
| | Throwing power (%) | | 30 | 40 | 15 | 30 |
| | Gas pinhole generation voltage (V) | | 200 | 190 | 170 | 190 |
| | Low-temperature baking corrosion resistance | | C | B | A | A |
| | Edge rust preventability | | D | C | A | B |

It was confirmed that each electrodeposition coating composition of examples has high throwing power. It has also been confirmed that the 50° C. coating film viscosity of each of these electrodeposition coating compositions falls within a proper range, and generation of gas pinholes can be suppressed.

The electrodeposition coating composition of Comparative Example 1 is an example which contains neither the zinc compound (A-1) nor the bismuth compound (A-2) and has a MEQ (A) less than 27. In this comparative example, generation of uneven polishing and drying mark was confirmed, and it was confirmed that the electrodeposition coating film unevenly precipitated. It was also confirmed that this electrodeposition coating composition is deteriorated in corrosion resistance and edge rust preventability since it contains neither the zinc compound (A-1) nor the bismuth compound (A-2).

The electrodeposition coating composition of Comparative Example 2 is an example having a MEQ (A) less than 27. Generation of uneven polishing and drying mark was confirmed also in this comparative example, and it was therefore confirmed that the electrodeposition coating film unevenly precipitated.

It was confirmed that the electrodeposition coating compositions of Comparative Examples 3 and 4 are each outstandingly inferior in throwing power to that of examples. It was also confirmed that these comparative examples each have a high coating film viscosity at 50° C. and are each deteriorated in the ability to suppress the generation of gas pinholes.

INDUSTRIAL APPLICABILITY

The electrodeposition coating composition of the present invention has the characteristics that it enables the preparation of a cured electrodeposition coating film exhibiting excellent throwing power and having a good appearance. The electrodeposition coating composition of the present invention also has the characteristics that even in the case of performing electrodeposition coating of an article to be coated provided with a thin chemical conversion treatment film formed with, for example, a zirconium chemical conversion treatment agent, a cured electrodeposition coating film having a good appearance can be obtained similarly to the case of coating an article to be coated treated with a zinc phosphate chemical conversion treatment agent. The use of the electrodeposition coating composition of the present invention enables the formation of a cured electrodeposition coating film having a good appearance and excellent corrosion resistance even in the case of coating an article to be coated treated using a zirconium chemical conversion treatment agent reduced in environmental burden. This zirconium chemical conversion treatment agent has an advantage that it can reduce the amount of sludge to be generated. The chemical conversion treatment using this zirconium chemical conversion treatment agent further has an advantage that chemical conversion treatment of an article to be coated can be performed in a reduced number of process steps because it requires no surface control process.

DESCRIPTION OF REFERENCE SIGNS

10: Box
11 to 14: Chemical conversion-treated steel sheet
15: Through hole
20: Electrodeposition coating container
21: Electrodeposition coating material
22: Counter electrode

The invention claimed is:

1. An electrodeposition coating composition comprising:
    0.001 to 1 part by mass of a zinc compound (A-1) based on 100 parts by mass of the composition;
    an aminated resin (B); and
    a curing agent (C),
    wherein
    a milligram equivalent (MEQ (A)) of an acid per 100 g of the resin solid content in the composition is 27 or more;
    a coulombic efficiency of the composition is 30 mg/C or less;
    a film resistance of a 15-μm-thick uncured electrodeposition coating film formed using the composition is 400 kΩ·cm$^2$ or more;
    a coating film viscosity of an electrodeposition coating film obtained from the composition is 3000 Pa·s or less at 50° C.;
    the composition comprises an emulsion obtained by neutralizing a resin emulsion containing the aminated resin (B) and the curing agent (C) with the acid, wherein the acid is one or more selected from the group consisting of methanesulfonic acid, and dimethylolpropionic acid;
    the composition does not contain sulfamic acid; and
    a throwing power evaluated by a four-sheet box method is more than 50%.

2. The electrodeposition coating composition according to claim 1, wherein the aminated resin (B) is a resin obtained by reacting an amine compound with a resin obtained by reacting a bisphenol A alkylene oxide adduct (b-1), an epoxy resin (b-2), and a bisphenol compound (b-3).

3. The electrodeposition coating composition according to claim 1, wherein the composition contains not more than 50 ppm of an organolead compound in terms of a lead metal element and not more than 50 ppm of an organotin compound in terms of a tin metal element.

4. The electrodeposition coating composition according to claim 1, wherein the zinc compound (A-1) is a zinc salt having at least one member selected from the group consisting of acetic acid, methanesulfonic acid, formic acid, dimethylolpropionic acid, gluconic acid, glycine and aspartic acid as a counter ion.

5. An electrodeposition coating method comprising dipping an article to be coated after being subjected to zirconium chemical conversion treatment in the electrodeposition coating composition as claimed in claim 1 to form the electrodeposition coating film; and
    heating the obtained electrodeposition coating film to form a cured electrodeposition coating film.

6. A method of improving an appearance of a cured electrodeposition coating film in electrodeposition coating comprising
    dipping an article to be coated after being subjected to zirconium chemical conversion treatment in the electrodeposition coating composition as claimed in claim 1 to form the electrodeposition coating film, and
    heating the obtained electrodeposition coating film to form the cured electrodeposition coating film.

* * * * *